J. C. THOMAS.
PRESS.
APPLICATION FILED JAN. 3, 1914. RENEWED MAR. 19, 1915.
1,205,949.
Patented Nov. 21, 1916.
2 SHEETS—SHEET 1.
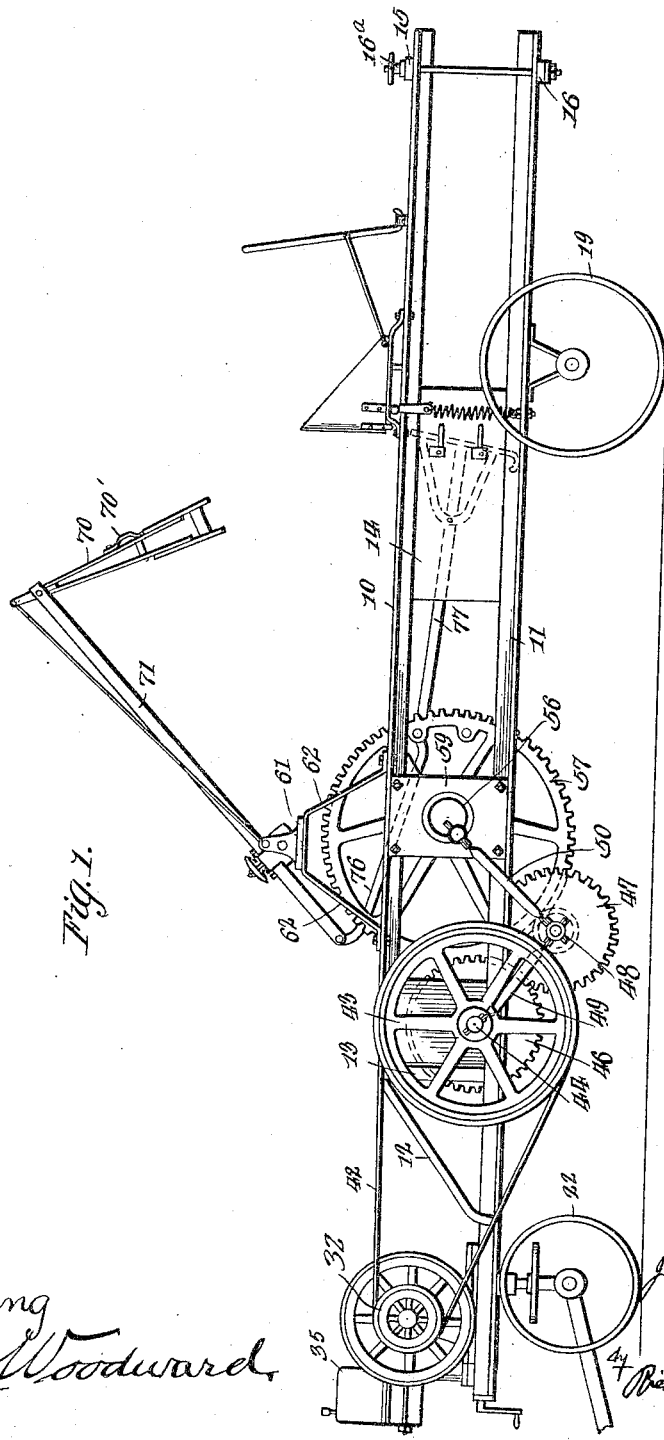

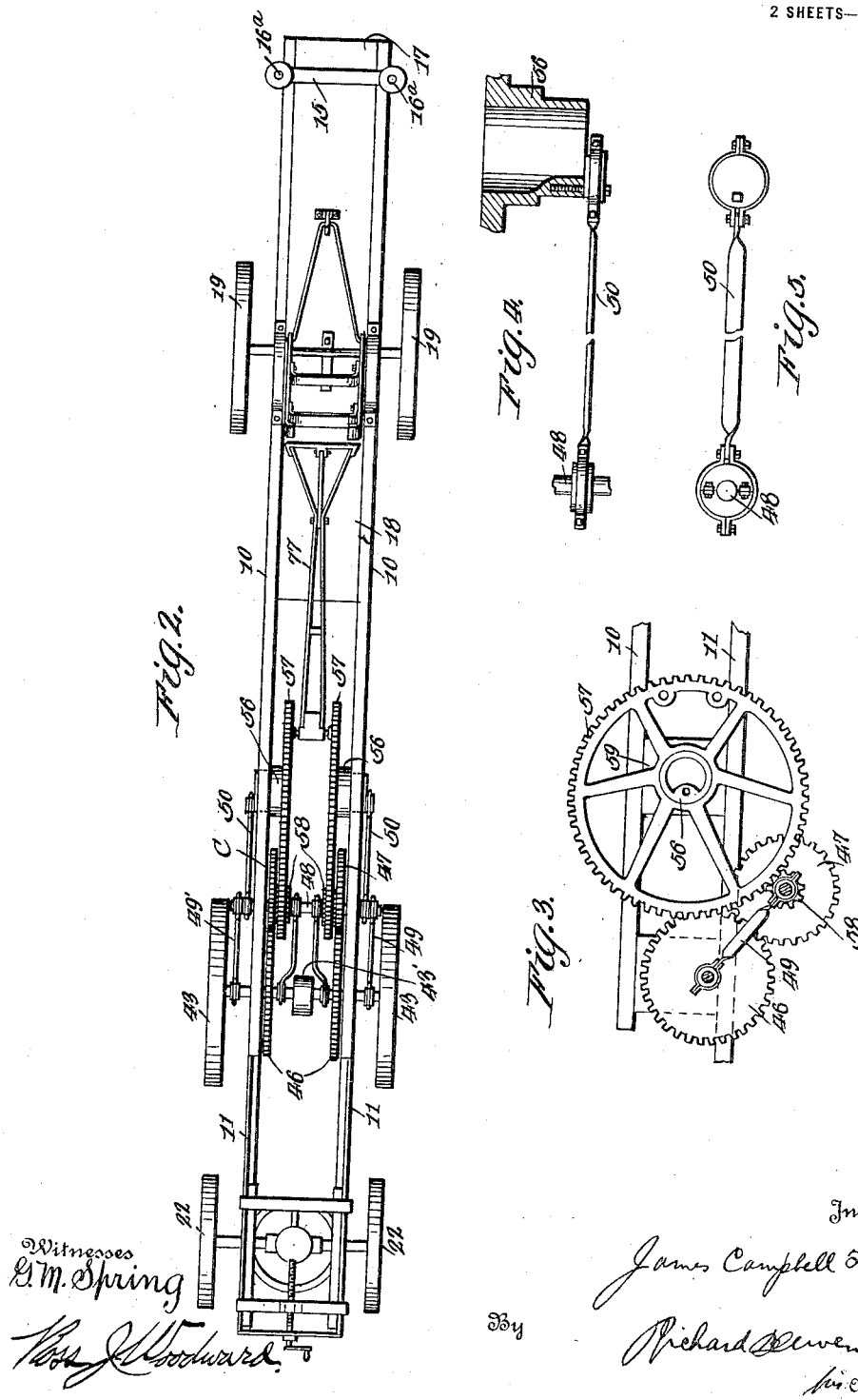

UNITED STATES PATENT OFFICE.

JAMES CAMPBELL THOMAS, OF OTTUMWA, IOWA, ASSIGNOR TO DAIN MANUFACTURING COMPANY OF IOWA, OF OTTUMWA, IOWA, A CORPORATION OF IOWA.

PRESS.

1,205,949.

Specification of Letters Patent.

Patented Nov. 21, 1916.

Application filed January 3, 1914, Serial No. 810,224. Renewed March 19, 1915. Serial No. 15,651.

*To all whom it may concern:*

Be it known that I, JAMES CAMPBELL THOMAS, a subject of the King of Great Britain, residing at Ottumwa, in the county of Wapello and State of Iowa, have invented certain new and useful Improvements in Presses, of which the following is a specification, reference being had to the accompanying drawings.

My invention relates to presses such as those used for baling hay and analogous purposes, and has particularly to do with hay presses of the type shown and described in the application for patent of Joseph Dain, filed September 20, 1912, Serial No. 721,354, in which the plunger by which the hay is compressed is operated by an eccentrically-mounted gear or gears rotated by means of pinions which are driven from a suitable source of power, such as a gasolene engine, the engine being preferably mounted on the carriage of the press, but which may also employ any other suitable source of power. In such presses, owing to the eccentric mounting of the drive gear or gears, it is necessary that the pinion or pinions which drive such gears move toward and from the axis of rotation of said gears so that they may constantly mesh therewith, and the object of my present invention is to provide improved means for mounting such pinion or pinions and connecting them with the source of power so that they will be driven constantly and will be maintained in mesh with the eccentric gear or gears. I accomplish this object as illustrated in the drawings and as hereinafter described. That which I believe to be new is set forth in the claims.

In the accompanying drawings,—Figure 1 is a side elevation of a hay press embodying my improvements; Fig. 2 is a plan view thereof, the engine being removed; Fig. 3 is a detail, being a side elevation of one of the eccentric gears and the driving connections therefor; Fig. 4 is an enlarged view, partly in section, illustrating the connections by which one of the pinions is held in mesh with its eccentric gear; and Fig. 5 is a side elevation of the parts shown in Fig. 4.

Referring to the drawings,—10—11 indicate upper and lower longitudinally-extending angle-bars, which form the principal parts of the frame of the press, the forward end portions 12 of the upper bars 10 being bent downwardly and connected with the lower bars by any suitable means, as shown in Fig. 1. Vertical bracing bars 13 are provided adjacent the forward ends of the bars 10 and connect said bars with the bars 11 so as to hold the forward end portions of the frame rigidly in spaced relation. These bars 10—11 are parallel throughout their length and carry plates which form the side walls 14 of the baling-chamber. Upper and lower cross-bars 15—16 are placed adjacent to the rear ends of the bars 10—11 and are connected by adjusting-rods 16$^a$ in the usual way so as to regulate the tension on the bale.

17—18 indicate upper and lower plates carried by the bars 10—11, respectively, to form a bottom for the baling-chamber, and also a cover for that portion of the frame which carries the finished bales. It is obvious that the lower plate 18 extends to the rear ends of the lower bars 11. As illustrated, the frame of the press is mounted on wheels 19 and 22 in the usual way.

35 indicates a motor, preferably a gasolene engine, which, in the construction shown, is mounted upon the forward end portion of the frame of the press.

44 indicates a transverse shaft mounted at the forward end portion of the press frame, said shaft carrying pulleys 43 at the opposite sides of the press, which pulleys, in the construction shown, are adapted to be driven by belts 42 from pulleys 32 carried by the engine. The shaft 44 is also provided centrally with a pulley 43' to permit of the rotation of said shaft by a belt leading from a motor not carried by the press frame, when it is desired to operate the press in that way.

46 indicates gears mounted on and keyed to the shaft 44 for transmitting power from the shaft 44 in the manner hereinafter described.

48 indicates a transverse shaft which is supported in suitable bearings carried by swinging links 49—49' mounted on the shaft 44, so that the shaft 48 is held in parallelism with the shaft 44 by said links but is free to swing concentrically therewith.

47 indicates gears, which are mounted on the shaft 48 and mesh with the gears 46 so as to be driven thereby.

57 indicates circular gears, which are eccentrically mounted upon stub-axles 56 suitably journaled in the frame of the press, as best shown in Figs. 1 and 3. Preferably, said axles are mounted in blocks 59, which are fixedly secured to the upper and lower bars 10—11 of the press so that they are held firmly in position.

58 indicates pinions mounted on the shafts 48 and meshing with the gears 57, as shown in Figs. 1 and 3.

50 indicates straps, which are pivoted concentrically with the gears 57 and are connected with the shaft 48 so as to hold the pinions 58 constantly in mesh with the gears 57, notwithstanding the eccentric mounting of the latter gears. It will be apparent that by this construction the shaft 48 will swing through an arc of which the straps 50 are radii, and that at the same time the gears 47 will be held in mesh with the gears 46 and the pinions 48 will be held in mesh with the gears 57. Consequently, by rotating the main drive-shaft 44, the gears 57 may be constantly driven.

77 indicates the plunger by which the hay is compressed, said plunger being connected eccentrically with the gears 57, near the peripheries thereof, and at the points nearest the axles of said eccentric gears. As the pinions 58 by which the eccentric gears 57 are driven are substantially at the opposite sides of the axis of rotation of said eccentric gears from the pivotal connections of the plunger therewith, it will be apparent that the leverage of the drive pinions 58 upon the eccentric gears 57 will gradually increase as the plunger approaches the end of its compression stroke, while the speed of the plunger will gradually increase as it recedes from the point of greatest compression until it again begins its compression stroke. Thus the plunger is operated more quickly but with less power on the return stroke and with the greatest power and at slower speed on its compression stroke.

71 indicates a feeder-arm, which is pivotally mounted on a base 61 carried by standards 62 secured to the upper bars 10. The feeder-arm 71 is provided with a head 70 by which the hay is fed into the baling-chamber in the usual way, said feeder-arm being operated by links 76 which connect its forward end with the gears 57 at the same points at which the plunger 77 is connected with said gears. By this construction the feeding mechanism is operated so as to feed hay to the baling-chamber on the return stroke of the plunger and is raised out of operative position on the compression stroke thereof.

That which I claim as my invention, and desire to secure by Letters Patent, is—

1. In a press of the character described, a frame including a pressing chamber, a driven shaft rotatably connected with said frame, gear-wheels rigidly secured to said driven shaft, eccentric gear-wheels rotatably connected with said frame, a hanging shaft positioned beneath said frame, supporting links loosely connected with said hanging shaft and with said driven shaft, a second set of supporting links loosely connected with said hanging shaft and eccentrically connected with said eccentric gear-wheels whereby rotation of said eccentric gear-wheels will cause vertical movement of said hanging shaft, gear-wheels rigidly secured to said hanging shaft and meshing with the gear-wheels of said driven shaft, gear-wheels rigidly secured to said hanging shaft and meshing with said eccentric gear-wheel, vertical movement of said hanging shaft keeping said gear-wheels at all times in mesh, a plunger operated by said eccentric gear-wheels and moving in said compressing chamber, and a feeding plunger operated by said eccentric gear-wheels for feeding material into said compressing chamber.

2. A press of the character described comprising a frame including a pressing chamber, eccentric gear-wheels rotatably supported by said frame, a driven shaft rotatably supported by said frame, gear-wheels carried by said driven shaft, a hanging shaft, gear-wheels carried by said hanging shaft and meshing with said eccentric gear-wheels and with the gear-wheels of said driven shaft, means for supporting said hanging shaft and operated by said eccentric gear-wheels to keep said gear-wheels at all times in mesh during their rotation, feeding means operated by said eccentric gear-wheels, and compressing means operated by said eccentric gear-wheels.

3. A press of the character described, comprising a frame including a pressing chamber, a driven shaft, gear-wheels carried by said driven shaft, eccentric gear-wheels carried by said frame, bodily-movable means for transmitting rotary motion from the gear-wheels of said driven shaft to said eccentric gear-wheels, feeding means operated by said eccentric gear-wheels, and compressing means operated by said eccentric gear-wheels.

4. A press including a supporting frame, a driven shaft, operating means including an eccentric gear-wheel, a gear-wheel carried by said driven shaft, and bodily-movable means for transmitting rotary motion from the gear-wheel of said driven shaft to said eccentric gear-wheel.

5. A press including a supporting frame, a driven shaft, operating means including an eccentric gear-wheel, a gear-wheel carried by said driven shaft, a hanging shaft, loosely-mounted means suspending said hanging shaft from said driven shaft and eccentric gear-wheel, and means carried by said hanging shaft and meshing with the gear-wheel of said driven shaft and with said eccentric gear-wheel to permit rotary motion to be transmitted from the gear-wheel of said driven shaft to said eccentric gear-wheel.

6. A press, comprising a plunger, an eccentric gear for actuating said plunger, a pinion meshing with said gear, means for holding said pinion in mesh with said gear, a shaft, and means for driving said pinion from said shaft.

7. A press, comprising a plunger, an eccentric gear for actuating said plunger, a pinion meshing with said gear, means for holding said pinion in mesh with said gear, a shaft, means for holding said pinion at a constant distance from the axis of said shaft, and means for driving said pinion from said shaft.

8. A press, comprising a plunger, an eccentric gear for actuating said plunger, a pinion meshing with said gear, means for holding said pinion in mesh with said gear, a shaft, swinging means for holding said pinion at a constant distance from the axis of said shaft meanwhile permitting it to swing concentrically therewith, and means for driving said pinion from said shaft.

9. A press, comprising a plunger, an eccentric gear for actuating said plunger, a pinion meshing with said gear, a shaft, swinging members arranged concentrically with said gear and shaft, respectively, for positioning said pinion, and means for driving said pinion from said shaft.

10. A press, comprising a plunger, an eccentric gear, a stationary shaft, a pinion for driving said eccentric gear and movable concentrically with relation to said shaft, and means for driving said pinion from said shaft.

11. A press, comprising a plunger, an eccentric gear, a stationary shaft, a pinion for driving said eccentric gear and movable concentrically with relation to said shaft, means for holding the pinion in mesh with said eccentric gear, and means for driving said pinion from said shaft.

12. A press, comprising a plunger, an eccentric gear for actuating said plunger, a pinion meshing with said gear, a shaft on which said pinion is mounted, a link connecting said shaft concentrically with said eccentric gear, a stationary shaft, a swinging member connecting said first-mentioned shaft with said stationary shaft, and means for driving said first-mentioned shaft from said stationary shaft.

In testimony whereof I affix my signature in presence of two witnesses.

JAMES CAMPBELL THOMAS.

Witnesses:
JULIUS E. GOEHRING,
CAREY M. ORMAN.

Copies of this patent may be obtained for five cents each, by addressing the "Commissioner of Patents, Washington, D. C."